United States Patent
Bae et al.

(10) Patent No.: US 10,852,741 B2
(45) Date of Patent: Dec. 1, 2020

(54) USING CAMERAS FOR DETECTING OBJECTS NEAR A VEHICLE

(71) Applicant: Faraday & Future Inc., Gardena, CA (US)

(72) Inventors: Hong S. Bae, Torrance, CA (US); Aziz Umit Batur, Torrance, CA (US); Evan Roger Fischer, Torrance, CA (US); Oliver Max Jeromin, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/610,412

(22) Filed: May 31, 2017

(65) Prior Publication Data

US 2018/0299900 A1 Oct. 18, 2018

Related U.S. Application Data

(60) Provisional application No. 62/343,741, filed on May 31, 2016.

(51) Int. Cl.
| | |
|---|---|
| *G05D 1/02* | (2020.01) |
| *G06K 9/00* | (2006.01) |
| *G06K 9/62* | (2006.01) |
| *B60W 30/06* | (2006.01) |

(Continued)

(52) U.S. Cl.
CPC .......... *G05D 1/0238* (2013.01); *B60W 30/06* (2013.01); *B60W 50/14* (2013.01); *G05D 1/0088* (2013.01); *G05D 1/0212* (2013.01); *G06K 9/00805* (2013.01); *G06K 9/6202* (2013.01); *G06K 9/6215* (2013.01); *B60W 2420/42* (2013.01); *B60W 2420/52* (2013.01); *B60W 2420/54* (2013.01); *B60W 2554/00* (2020.02);

(Continued)

(58) Field of Classification Search
CPC .. G05D 1/0238; G05D 1/0088; G05D 1/0212; G05D 2201/0213; B60W 30/06; B60W 2420/42; G06K 9/6215; G06K 9/00805
See application file for complete search history.

(56) References Cited

U.S. PATENT DOCUMENTS

| | | | |
|---|---|---|---|
| 9,557,741 B1 * | 1/2017 | Elie | ...................... G05D 1/0251 |
| 2009/0085771 A1 * | 4/2009 | Wu | .................... B62D 15/0285 |
| | | | 340/932.2 |

(Continued)

*Primary Examiner* — Rodney A Butler
(74) *Attorney, Agent, or Firm* — Veros Legal Solutions, LLP

(57) ABSTRACT

A method for autonomously controlling a vehicle is disclosed. In some examples, a vehicle can maneuver out of a parking space in an autonomous and unmanned operation. While parking, the vehicle can capture first one or more images of its surroundings and store the images in a memory included in the vehicle. Upon starting up, the vehicle can capture second one or more images of its surroundings and compare them to the first one or more images to determine if there is an object, person, or animal proximate to the vehicle, for example. In some examples, in accordance with a determination that there is no object, person, or vehicle present that was not present during parking, the vehicle can autonomously move from the parking space with or without a user present in the vehicle.

15 Claims, 4 Drawing Sheets

(51) Int. Cl.
*G05D 1/00* (2006.01)
*B60W 50/14* (2020.01)

(52) U.S. Cl.
CPC ..... *B60W 2555/20* (2020.02); *B60W 2556/50* (2020.02); *G05D 2201/0213* (2013.01)

(56) References Cited

U.S. PATENT DOCUMENTS

| | | | |
|---|---|---|---|
| 2013/0238441 A1* | 9/2013 | Panelli | B60Q 1/503 |
| | | | 705/14.62 |
| 2014/0058613 A1* | 2/2014 | Leinfelder | B62D 15/028 |
| | | | 701/28 |
| 2014/0180523 A1* | 6/2014 | Reichel | B62D 15/0285 |
| | | | 701/23 |
| 2015/0043779 A1* | 2/2015 | Huntzicker | B60Q 9/008 |
| | | | 382/104 |
| 2015/0088360 A1* | 3/2015 | Bonnet | B60W 30/06 |
| | | | 701/23 |
| 2015/0370255 A1* | 12/2015 | Harvey | B62D 15/0285 |
| | | | 701/24 |
| 2016/0110619 A1* | 4/2016 | Kim | G06K 9/00812 |
| | | | 382/104 |
| 2016/0114728 A1* | 4/2016 | Tan | B60R 1/00 |
| | | | 348/148 |
| 2016/0144857 A1* | 5/2016 | Ohshima | G05D 1/0061 |
| | | | 701/23 |
| 2017/0050521 A1* | 2/2017 | Shaw | B60K 35/00 |
| 2017/0052537 A1* | 2/2017 | Salinas | H04L 67/125 |
| 2017/0101090 A1* | 4/2017 | Jung | B60W 30/06 |
| 2017/0225679 A1* | 8/2017 | Bonnet | B60W 30/06 |
| 2017/0285646 A1* | 10/2017 | Connor | B60W 50/14 |
| 2018/0178780 A1* | 6/2018 | Hwang | B60W 30/06 |

\* cited by examiner

USING CAMERAS FOR DETECTING OBJECTS NEAR A VEHICLE

CROSS-REFERENCE TO RELATED APPLICATIONS

This application claims the benefit of U.S. Provisional Application No. 62/343,741, filed May 31, 2016, the entirety of which is hereby incorporated by reference.

FIELD OF THE DISCLOSURE

This relates to a vehicle and, more particularly, to a vehicle configured to autonomously move from a parking space.

BACKGROUND OF THE DISCLOSURE

Onboard cameras have become increasingly common in consumer automobiles. Typically, these cameras are mounted to the back of a vehicle so the driver can conveniently monitor the space behind the vehicle when driving in reverse, though some vehicles may include forward- and/or side-facing cameras as well. In some examples, one or more external cameras can capture images and/or video to be displayed inside the vehicle to assist a driver while parking the vehicle, removing the vehicle from a parking spot, and/or otherwise maneuvering the vehicle in a tight space. In some examples, onboard cameras can improve the driver's understanding of the vehicle's surroundings, improving safety. In some examples, a vehicle may also include LIDAR or ultrasonic sensors to detect proximate objects, but these sensors may not perform well when detecting objects at a close (e.g., approximately six to twelve inches or less) distance. Accordingly, one or more onboard cameras can be used in conjunction with other sensors on the vehicle during autonomous driving, for example.

SUMMARY OF THE DISCLOSURE

This relates to a vehicle and, more particularly, to a vehicle configured to autonomously move or exit from a parking space. In some examples, a vehicle can include a plurality of external cameras configured to capture images of the vehicle's surroundings during a parking operation. The captured images of the vehicle's surroundings can be stored before the vehicle is turned off. When the vehicle subsequently starts or is powered on, the cameras can capture second images of the vehicle's surroundings before moving the vehicle. In some examples, a processor incorporated into the vehicle can compare the first images to the second images to determine if there are differences in the images indicative of an object proximate to the vehicle. In accordance with a determination that there is no object proximate to the vehicle, the vehicle can autonomously exit its parking space, for example.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

This relates to a vehicle and, more particularly, to a vehicle configured to autonomously move from a parking space. In some examples, a vehicle can include a plurality of external cameras configured to capture images of the vehicle's surroundings during a parking operation. The captured images of the vehicle's surroundings can be stored before the vehicle is turned off. When the vehicle starts, the cameras can capture second images of the vehicle's surroundings. In some examples, a processor incorporated into the vehicle can compare the first images to the second images to determine if there are differences in the images indicative of an object proximate to the vehicle. In accordance with a determination that there is no object proximate to the vehicle, the vehicle can autonomously exit its parking space, for example.

Figure 1:
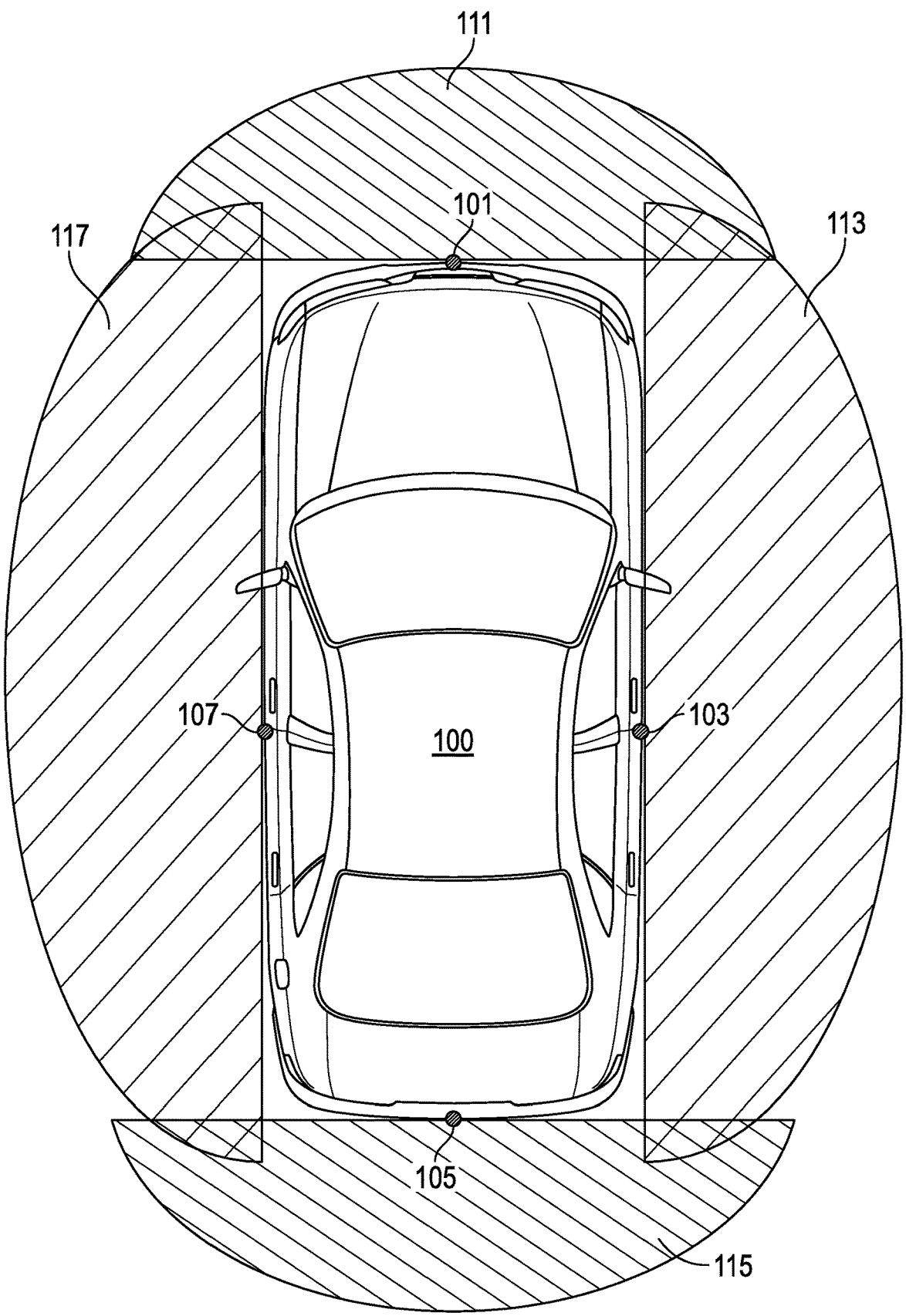
FIG. 1 illustrates a vehicle outfitted with external cameras and the cameras' fields of view according to examples of the disclosure.

In some examples, a vehicle can include one or more external cameras. FIG. 1 illustrates a vehicle 100 outfitted with external cameras 101, 103, 105, and 107 and the cameras' respective fields of view 111, 113, 115, and 117 according to examples of the disclosure. In some examples, the fields of view 111, 113, 115, and 117 can surround vehicle 100. The cameras 101, 103, 105, and 107 can capture one or more images and/or video of the surroundings of vehicle 100, for example. In some examples, the images and/or video can be displayed on an infotainment panel inside of vehicle 100 so that a vehicle operator can see the surroundings of vehicle 100. Cameras 101, 103, 105, and 107 can be especially helpful while an operator maneuvers the vehicle 100 into or out of a parking space or other small space, for example. In some examples, cameras 101, 103, 105, and 107 can help an operator of vehicle 100 safely maneuver the vehicle 100 by providing a larger field of view of the vehicle's surroundings as compared to the operator's field of view without cameras 101, 103, 105, and 107. In some examples, a larger field of view increases safety by making it easier for an operator to avoid an object, person, or animal proximate to the vehicle 100. In some examples, vehicle 100 can further include additional sensors including LIDAR, ultrasonic sensors, or other sensors for gathering data about the vehicle's surroundings.

Figure 2:
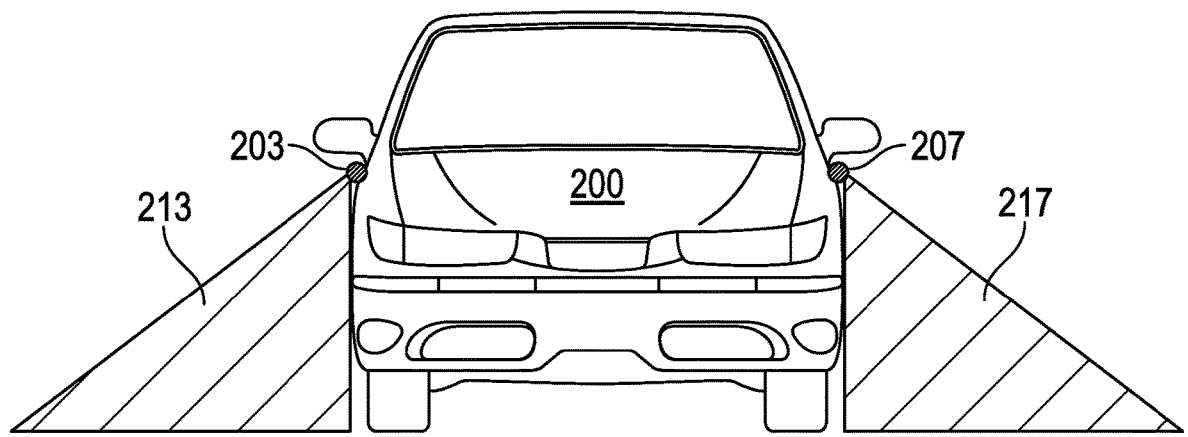
FIG. 2 illustrates a vehicle outfitted with external cameras and the cameras' fields of view from a different angle than in FIG. 1 according to examples of the disclosure.

As previously mentioned, one or more surround-view cameras on a vehicle can be used to capture footage of objects at a close proximity to the vehicle. FIG. 2 illustrates a vehicle 200 outfitted with external cameras 203 and 207 and the cameras' respective fields of view 213 and 217 from a different angle than in FIG. 1 according to examples of the disclosure. In some examples, the fields of view 213 and 217 can include a side of the vehicle 200 and part of the ground proximate to the vehicle 200. Accordingly, one or more images and/or video captured at cameras 213 and 217 can include objects proximate to or touching vehicle 200, when any are present. Although vehicle 200 is illustrated with two external cameras 213 and 217 disposed on the sides of vehicle 200, in some examples, other numbers of cameras and/or locations for the cameras may be used—for example, vehicle 200 can include the camera configuration of vehicle 100 of FIG. 1. In some examples, vehicle 200 can further include additional sensors for gathering data about the vehicle's surroundings, such as LIDAR, ultrasonic sensors, and/or other sensors.

Figure 3:
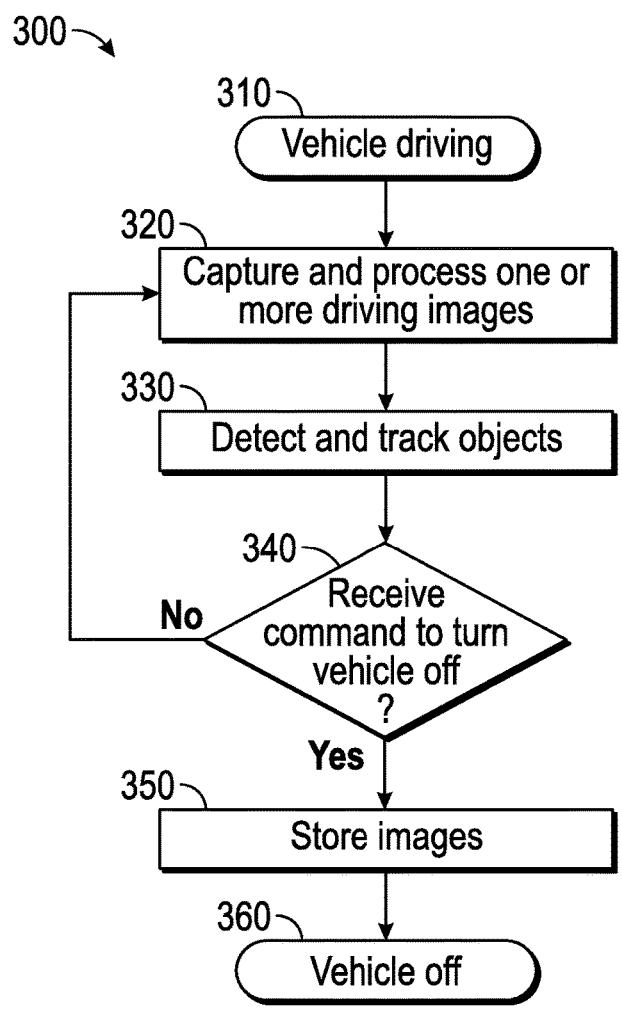
FIG. 3 illustrates a method of storing information about a vehicle's surroundings during a parking operation according to examples of the disclosure.

In some examples, a vehicle can be configured to autonomously maneuver into and out of a parking space using one or more of the cameras described with references to FIGS. 1-2. FIG. 3 illustrates a method 300 of storing information about a vehicle's surroundings during a parking operation according to examples of the disclosure. The method 300 can be performed and begin while the vehicle (e.g., vehicle 100 or vehicle 200) is driving 310, for example. In some examples, driving 310 can include vehicle operation by a driver, fully autonomous driving, or vehicle operation by a driver assisted by one or more fully or partially automated systems on the vehicle.

While driving, the vehicle can capture and process one or more images of its surroundings in step 320, for example. In some examples, the one or more images can be captured by one or more external cameras, such as cameras 101, 103, 105, 107, 203, or 207. The images can be processed using any known technique to extract information about the vehicle's surroundings, for example. In some examples, image processing data can be used by an autonomous driving system to navigate the vehicle autonomously. For example, image processing can be used to detect lines on a road such as lane lines or lines denoting a parking space for use in autonomous or semi-autonomous driving operations. The vehicle can also gather data about its surroundings using additional sensors, such as LIDAR or ultrasonic sensors, for example.

In some examples, image processing 320 can be used to identify one or more objects in the captured images (e.g., objects in the vehicle's vicinity). These objects can be detected and tracked in step 330, for example. Data from one or more additional sensors, such as LIDAR, ultrasonic sensors, or other sensors, can additionally or alternatively be used to identify objects captured in one or more captured images of the vehicle's surroundings. In some examples, the vehicle can avoid the one or more tracked objects while driving autonomously or semi-autonomously using the detection and tracking of the objects performed at 330. If a driver is operating the vehicle, detecting and tracking objects can produce alerts to notify the driver of proximate objects so that they can be avoided. Other fully- and partially-autonomous systems can use object detection and tracking to improve safety and comfort of a user of the vehicle, for example.

In some examples, at step 340, while the vehicle is being driven, it can be determined whether a command to turn off the vehicle has been received. In some examples, a command to turn off the vehicle can be automatically generated by an autonomous parking operation (e.g., when the parking operation has been completed). In some examples, a user may input a command to turn off the vehicle using a button, switch, and/or voice command included in the vehicle. For example, a driver may wish to turn off the vehicle once it is parked at its destination. If no command to turn off the vehicle is received, the method can return to step 320 to capture more images of the vehicle's surroundings, for example.

If a command to turn off the vehicle is received in step 340, one or more captured images of the vehicle's surroundings can be stored in step 350, for example. In some examples, the captured images can reflect the vehicle's surroundings in a parking space or other location where the vehicle has been parked. The captured images can be images corresponding to a predetermined amount of time before the command to turn off the vehicle was received (e.g., the images can be images that were captured during the prior three seconds before the command to turn off the vehicle was received), while in some examples, the images can be only images from the moment the command to turn off the vehicle was received (e.g., still images). Further, in some examples, additionally or alternatively to storing the above-described images in response to receiving a command to turn off the vehicle, the vehicle can store the above-described images in response to receiving a command to park the vehicle (e.g., in response to putting the vehicle in a parked state or gear), regardless of whether the vehicle remains on while parked. The one or more captured images can be stored in a memory incorporated into an onboard computer of the vehicle. Once the one or more images have been stored, the vehicle can turn off in step 360.

Figure 4:
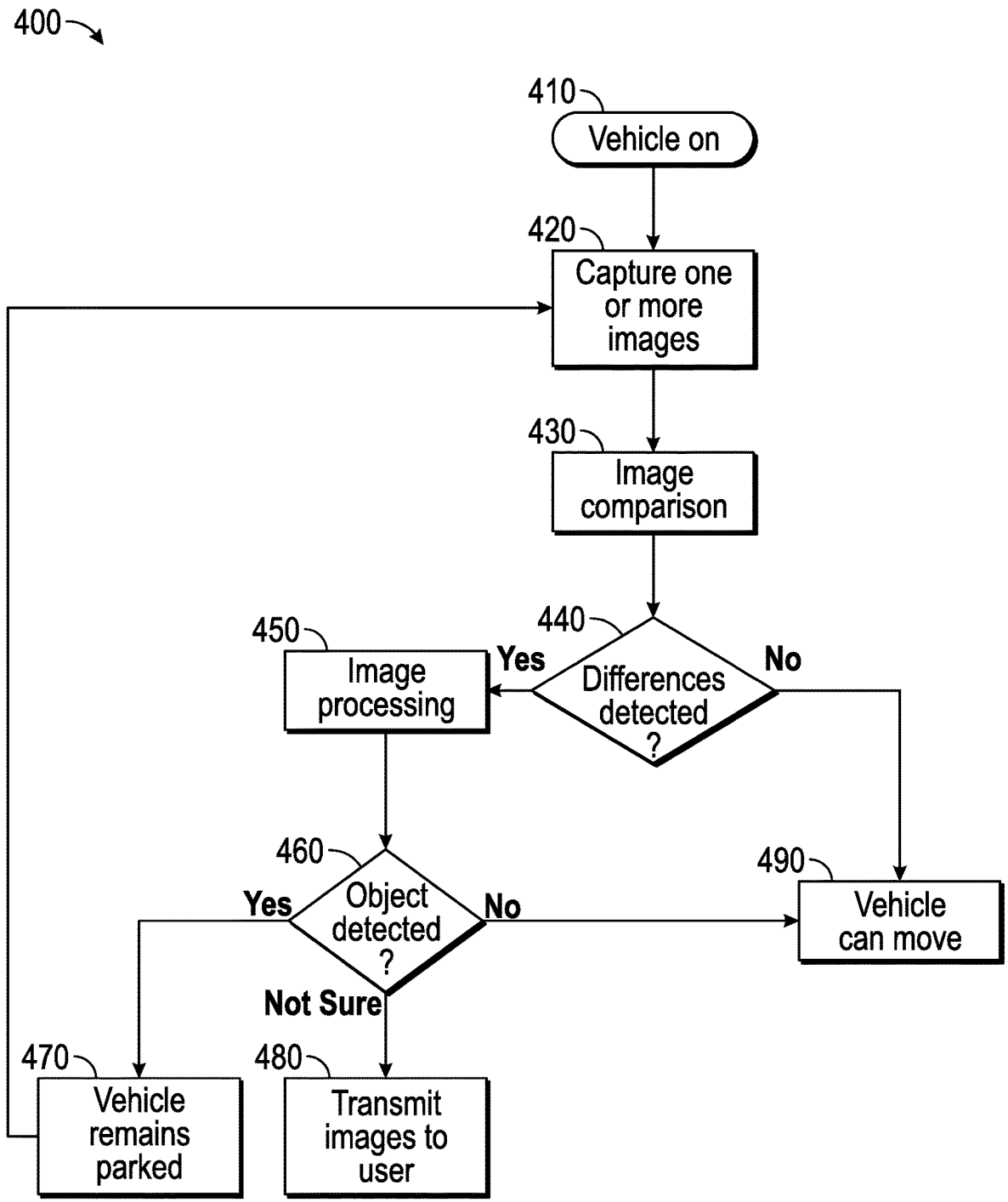
FIG. 4 illustrates a method for checking the surroundings of a vehicle according to examples of the disclosure.

In some examples, a vehicle can autonomously retrieve itself from a parking spot or lot with or without a driver in the vehicle. To avoid a collision with a proximate object when doing so, the vehicle can check its immediate surroundings (i.e., areas the vehicle can drive in) for proximate objects before moving. FIG. 4 illustrates a method 400 for checking the surroundings of a vehicle according to examples of the disclosure. Method 400 can be executed after the vehicle has stored one or more images of its surroundings prior to power off or parking using method 300, for example. In some examples, method 400 can be performed as part of an unmanned, autonomous operation for retrieving the vehicle from a parking space.

In some examples, method 400 can begin while the vehicle is on in step 410. Starting the vehicle can include enabling a power supply for an electric vehicle or starting an engine of a fuel-powered vehicle, for example. In some examples, the vehicle may be started in accordance with a received input from a mobile device associated with a user of the vehicle or in response to a button, switch, or voice command input at the vehicle itself. Further, method 400 can be performed in response to a command or input (e.g., received from a user of the vehicle, as described above) for the vehicle to autonomously move (e.g., to autonomously drive to the user's location) after having parked and/or turned off at a parking location.

Upon starting, the vehicle can capture one or more images of its surroundings in step 420. One or more external cameras, such as cameras 101, 103, 105, 107, 203, or 207, can be used to capture the one or more images, for example. In some examples, the frames of the images (e.g., which define the areas in the vehicle's surroundings that the cameras are capturing) captured in step 420 can be similar to or substantially the same as the frames of the images previously captured in step 320 (e.g., similar to or substantially the same as the frames of the images stored in response to the vehicle previously turning off or parking). Capturing images in step 420 with the same frames as the images previously captured in step 320 can ensure that the same area around the vehicle is captured each time, for example. In some examples, the vehicle can be in a same location and the cameras (e.g., cameras 101, 103, 105, 107, 203, or 207) can be zoomed equally while performing steps 320 and 420 to avoid changing the captured frames. The images can provide visual data for the vehicle's surroundings in its parking space. In some examples, other sensors such as LIDAR or ultrasonic sensors can be used to gather additional data bout the vehicle's surroundings.

Next, in step 430, image comparison can be performed to determine whether the vehicle's surroundings have changed between when the images were captured while parking in step 320 and when the new images were captured in step 420. If both sets of images are the same, it can be determined that no new objects (e.g. a person, an animal or another obstruction) are proximate to the vehicle, and if there are differences in the two sets of images, further image processing can be performed to determine whether those differences are indicative of objects proximate to the vehicle. This image comparison-based determination performed at step 430 can provide a computationally-simple way to determine either that the vehicle can autonomously move from its parking location, or that further image processing is required to identify objects in the vehicle's surroundings. In some examples, step 430 can include loading, from a memory incorporated into the vehicle, one or more images captured prior to the most recent vehicle shutdown while the vehicle was positioned the same way it is positioned presently. In some examples, background formation, in which the stored images can be considered the "background" of the newly captured images, can be used during step 430. In some examples, only sections of the images corresponding to the vehicle's close surroundings (i.e., areas the vehicle may immediately enter by driving, such as areas within three, five or ten feet of the vehicle) are compared. For example, sections of the images corresponding to objects further away than a threshold distance (e.g., objects further than three or ten feet away) or in the sky (e.g., clouds) may not be compared. For segments of the images that are compared, in some examples, image comparison 430 can include a comparison of each of a plurality of small sections of the captured images. For example, individual pixels or groups of several pixels can be compared. If the same objects are in the two sets of images, where the frames of each camera are unchanged between capture of both sets of images, each pixel can be substantially the same. In some examples, other techniques can be performed to compare the sets of images, accounting for differences in lighting conditions, as will be described.

Various image processing algorithms, including pixel-by-pixel or region-by-region comparisons as discussed above, can be used in step 430 to analyze the images and determine at step 440 if there are differences between the parking images captured in step 320 and the retrieval images captured in step 420. In accordance with a determination that the two sets of images are identical or substantially the same, the vehicle can determine that it is free to move in step 490. In some examples, step 490 can include determining a subset of directions in which the vehicle can safely move. For example, if a second vehicle is parked facing the vehicle performing method 400 and appears in both sets of images, step 490 can include determining whether it is safe to move to either side or in reverse, but not forward. In some examples, step 490 can include autonomously driving the vehicle to a location where a user of the vehicle can access it. In some examples, in accordance with a determination that the sets of images are the same and therefore the vehicle surroundings are the same, the vehicle can exit its parking space by autonomously performing the same motions used to park, but in reverse. In some examples, in accordance with a determination that the sets of images are the same, the vehicle can exit its parking space using a path determined based on object identification that occurred previously, while the vehicle was parking in the parking space (e.g., on the assumption that, because the two set of images are the same, the objects in the vehicle's surroundings have stayed the same). In some examples, autonomous driving can include gathering data from one or more sensors (e.g., one or more cameras, LIDAR, and/or ultrasonic sensors) to safely maneuver the vehicle.

If, at step 440, there are differences detected between the sets of images, further image processing and determination algorithms can be performed in step 450 to determine whether the differences are indicative of an object proximate to the vehicle. In some examples, background formation, as mentioned above, can be used to identify one or more objects proximate to the vehicle. In some examples, differences in lighting (e.g., shadows) or weather (e.g., snow) can be detected and determined not to be indicative of an object proximate to the vehicle. In some examples, other techniques such as frame difference, wherein one or more images captured at slightly different locations are compared, and optical flow, wherein a direction of motion of objects within a series of images are determined, approaches can be used to detect one or more objects in motion near the vehicle. Details of exemplary image processing techniques are described in M. Ilsever and C. Unsalan, "Pixel-Based Change Detection Methods," *Two-Dimensional Change Detection Methods: Remote Sensing Applications*, Chapter 2, pages 7-21, 2012, which is hereby incorporated by reference. Based on image processing 450, and other sensor data (e.g., LIDAR and ultrasonic sensors), at step 460, a determination can be made whether an object is blocking the vehicle's movement, and thus, whether it is safe to move the vehicle. In some examples, LIDAR and ultrasonic sensors can be used to check one or more blind spots between the cameras and/or confirm presence of an object proximate to the vehicle. For example, LIDAR and/or ultrasonic sensors can detect objects at a moderate (e.g., six to twelve inches or further) distance from the vehicle with particularity. In some examples, one or more of a clock, a GPS, and weather data can also be used to determine that a difference in the sets of images is caused by lighting or weather, as opposed to a proximate object. For example, weather data can be wirelessly transmitted to an onboard computer of the vehicle. In accordance with a determination that detected differences between one or more images captured during parking and one or more images captured prior to vehicle retrieval are not indicative of an object proximate to the vehicle, the method 400 can proceed to step 490, allowing the vehicle to move, as described above.

When differences between the sets of images are indicative of an object proximate to the vehicle, the vehicle can remain parked in step 470. In some examples, the vehicle can generate a sound, light, or small motion to alert the proximate object (e.g., a proximate person or animal) to move away from the vehicle. The method 400 can then return to step 420 to capture another set of images to be processed. The method can continue, and based on a determination that there is no longer an object proximate to the vehicle, the vehicle can move in step 490. For example, if a person or animal that had been previously detected moves away, it will no longer be detected and the vehicle can determine that it is safe to move in step 490. In some examples, after repeating method 400 from step 420 several times when a detected object has not moved, a notification can be transmitted to a mobile device associated with a user of the vehicle to indicate that autonomous retrieval cannot be initiated.

As discussed previously, in some examples, even if an object is detected in step 460, it can be possible for the vehicle to autonomously navigate out of its parking space while avoiding the object. If, for example, there is an object detected at the front of the vehicle, but no objects detected at the rear, the vehicle can drive in reverse to exit its parking space, thus avoiding the object. The vehicle can use data from additional sensors, such as LIDAR or ultrasonic sensors, to safely maneuver out of its parking space autonomously, for example.

In some examples, the vehicle may not be able to resolve whether or not a difference between multiple sets of images is indicative of a proximate object in step 460. In some examples, one or more image processing algorithms can determine a probability that a difference is indicative of a proximate object and set a threshold for allowing motion in step 490 and a threshold for preventing motion in step 470. In some examples, these thresholds can be different, allowing for situations where the algorithm is "not sure" whether a difference is indicative of a proximate object. In some examples, a detected difference can be resolved by transmitting the one or more images captured after starting or powering on the vehicle to a mobile device associated with a user of the vehicle in step 480. In some examples, one or more live images and/or videos can be transmitted. The user can be presented with a user interface on the mobile device including the captured images and an input that is selectable to move the vehicle 490, an input that is selectable to generate a sound, light, or motion alert at the vehicle to alert a person or animal next to the vehicle, and an input that is selectable to prevent vehicle 470 from moving, for example. The user can select one or more of the above inputs, and the selected input(s) can be transmitted to the vehicle wirelessly to control it in accordance with the selected input.

Figure 5:
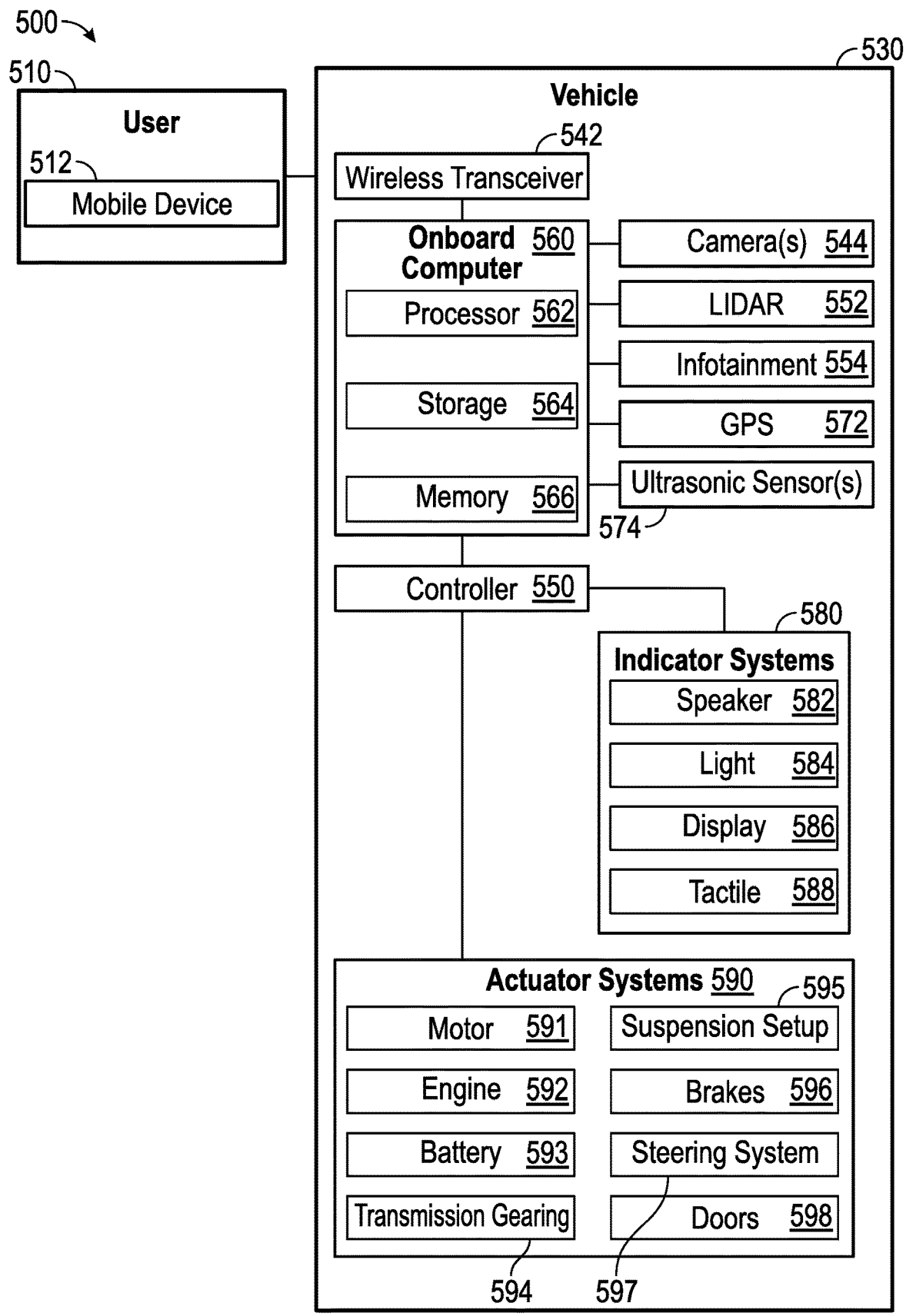
FIG. 5 illustrates a system block diagram according to examples of the disclosure.

FIG. 5 illustrates a system block diagram 500 according to examples of the disclosure. In some examples, a user 510 can send information to and receive information from vehicle 530 via their associated mobile device 512. In some examples, mobile device 512 can be a smartphone, a tablet, or another suitable computing device, for example. As described with reference to FIG. 4, in some examples, the user 510 of the vehicle 530 can use their mobile device 512 to view captured images of the surroundings of vehicle 530 and transmit input to the vehicle 530 to control it remotely. For example, the user 512 can transmit an input for the vehicle to play a sound, display a light, and/or produce a small movement to alert a nearby person or animal that the vehicle is about to move autonomously. In some examples, the vehicle 530 can include a wireless transceiver 542 to communicate with the vehicle's user 510 over a short-range wireless network (e.g. Bluetooth, Near Field Communication, ZigBee, etc.) and/or a long-range wireless network (e.g. Wi-Fi, cellular data network, etc.). Vehicle 530 can further include one or more cameras 544, such as cameras 101, 103, 105, 107, 203 and 207, for example. One or more cameras 544 included in vehicle 530 can be used to capture one or more images of the surroundings of vehicle 530 as part of any of the processes described with reference to FIGS. 1-4, for example. An infotainment system 554 can be provided to display one or more images captured at camera(s) 544 while user 510 is inside the vehicle, for example. In some examples, vehicle 530 can include an onboard computer 560 operatively coupled to wireless transceiver 542 and several electronic systems of the vehicle 530, as will be described. Onboard computer 560 can include a processor 562, storage 564, and memory 566, for example. In some examples, processor 562 can perform any of the steps of the methods described with reference to FIGS. 1-4. Processor 562 can be used for additional functions as well, such as managing any other system of vehicle 530, for example. In some examples, vehicle 530 can further include additional sensors, such as GPS 572, one or more ultrasonic sensors 574, and/or LIDAR 552. These sensors and/or other sensors included in vehicle 530 can provide data about the surroundings of vehicle 530 to be used in determining whether there is an object proximate to the vehicle.

In some examples, the vehicle 530 can further include controller 550 operatively coupled to onboard computer 560, one or more actuator systems 590 in the vehicle 530 and one or more indicator systems 580 in the vehicle. The one or more actuator systems 590 can include, but are not limited to, a motor 591 or engine 592, battery system 593, transmission gearing 594, suspension setup 595, brakes 596, steering system 597 and door system 598. The controller 550 can control one or more of these actuator systems 590 during vehicle operation; for example, to control the vehicle during an autonomous parking or vehicle retrieval process, using the motor 591 or engine 592, battery system 593, transmission gearing 594, suspension setup 595, brakes 596 and/or steering system 597, etc. In some examples, one or more doors can be opened or closed using door actuator system 598. The one or more indicator systems 580 can include, but are not limited to, one or more speakers 582 in the vehicle 530, one or more lights 584 in the vehicle, one or more displays 586 in the vehicle (e.g., as part of a control or infotainment system in the vehicle) and one or more tactile actuators 588 in the vehicle. The vehicle controller 550, in response to commands from onboard computer 560, can control one or more of these indicator systems 580 to provide indications to a user 510 of the vehicle (e.g., during a driver-controlled parking or vehicle retrieval operation) or to a person or animal proximate to the vehicle (e.g., prior to an autonomous vehicle retrieval operation). In some examples, controller 550 can control the one or more indicator systems 580 based on input via a mobile device 512 associated with a user 510 to do so.

Therefore, according to the above, some examples of the disclosure are directed to a method of controlling a vehicle, the method comprising: capturing one or more first images of the vehicle's surroundings with one or more external cameras of the vehicle; storing the one or more first images in a memory included in the vehicle; receiving an input corresponding to a request to move the vehicle; in response to receiving the input: capturing one or more second images of the vehicle's surroundings with the one or more external cameras; comparing the one or more second images to the one or more first images and determining whether there are differences between the one or more second images and the one or more first images; and in accordance with a determination that there are not differences between the one or more second images and the one or more first images, autonomously moving the vehicle in accordance with the input, and in accordance with a determination that there are differences between the one or more second images and the one or more first images, determining whether the differences are indicative of an object proximate to the vehicle. Additionally or alternatively to one or more of the examples disclosed above, in some examples, capturing the one or more first images occurs while performing a parking operating for the vehicle; storing the one or more first images occurs upon completion of the parking operation; and receiving the input corresponding to the request to move the vehicle occurs after the completion of the parking operation. Additionally or alternatively to one or more of the examples disclosed above, in some examples, the method further comprises in accordance with a determination that the differences between the one or more second images and the one or more first images are indicative of an object proximate to the vehicle, transmitting the one or more second images to a mobile device associated with a user of the vehicle; after transmitting the one or more second images to the mobile device, receiving a first input from the mobile device; and in response to receiving the first input from the mobile device: in accordance with a determination that the first input corresponds to a request to move the vehicle, autonomously moving the vehicle; and in accordance with a determination that the first input corresponds to a request to not move the vehicle, preventing the vehicle from moving. Additionally or alternatively to one or more of the examples disclosed above, in some examples, the method further comprises in accordance with a determination that the differences between the one or more second images and the one or more first images are indicative of an object proximate to the vehicle, generating one or more of a visual or auditory alert; after generating the one or more of the visual or auditory alert, determining whether the object is still proximate to the vehicle; in accordance with a determination that the object is no longer proximate to the vehicle, autonomously moving the vehicle; and in accordance with a determination that the object is still proximate to the vehicle: preventing the vehicle from moving; and transmitting a notification of the proximate object to a mobile device associated with a user of the vehicle. Additionally or alternatively to one or more of the examples disclosed above, in some examples, the method further comprises in accordance with a determination that the differences are indicative of an object proximate to the vehicle: selecting a path of vehicle motion in a direction such that the vehicle will avoid the object; and autonomously moving the vehicle along the selected path. Additionally or alternatively to one or more of the examples disclosed above, in some examples, determining whether the differences between the one or more second images and the one or more first images are indicative of an object proximate to the vehicle includes sampling data from one or more of a LIDAR sensor and an ultrasonic sensor. Additionally or alternatively to one or more of the examples disclosed above, in some examples, determining whether the differences between the one or more second images and the one or more first images are indicative of an object proximate to the vehicle includes sampling data from one or more of a GPS sensor, a clock, and weather data. Additionally or alternatively to one or more of the examples disclosed above, in some examples, the method of claim 1, further comprises in accordance with a determination that the differences are not indicative of an object proximate to the vehicle, autonomously moving the vehicle; and in accordance with a determination that the differences are indicative of an object proximate to the vehicle, preventing the vehicle from moving. Additionally or alternatively to one or more of the examples disclosed above, in some examples, the input corresponding to the request to move the vehicle comprises an input received from a mobile device associated with a user of the vehicle to move the vehicle to a location of the user. Additionally or alternatively to one or more of the examples disclosed above, in some examples, determining whether the differences are indicative of an object proximate to the vehicle includes determining a probability that the differences are indicative of an object proximate to the vehicle; and in accordance with a determination that the probability is above a first probability threshold, preventing the vehicle from moving; and in accordance with a determination the probability is below a second probability threshold, autonomously moving the vehicle. Additionally or alternatively to one or more of the examples disclosed above, in some examples, the method further comprises after storing the one or more first images and before capturing the one or more second images: turning off a power supply of the vehicle; and after turning off the power supply of the vehicle, turning on the power supply of the vehicle. Additionally or alternatively to one or more of the examples disclosed above, in some examples, determining whether there are differences between the one or more second images and the one or more first images comprises disregarding differences outside of a predetermined region of the images corresponding to an area within a threshold distance of the vehicle. Additionally or alternatively to one or more of the examples disclosed above, in some examples, the differences between the one or more second images and the one or more first images are indicative of an object proximate to the vehicle comprises: processing the one or more second images to identify one or more objects in the one or more second images; in accordance with a determination that at least one of the one or more objects in the one or more second images is proximate to the vehicle, determining that the differences between the one or more second images and the one or more first images are indicative of an object proximate to the vehicle; and in accordance with a determination that the one or more objects in the one or more second images are not proximate to the vehicle: determining that the differences between the one or more second images and the one or more first images are not indicative of an object proximate to the vehicle; and autonomously moving the vehicle in accordance with the input. Additionally or alternatively to one or more of the examples disclosed above, in some examples, autonomously moving the vehicle comprises selecting a path for the vehicle based at least in part on object identification performed using the one or more first images before the input corresponding to the request to move the vehicle was received.

Some examples of the disclosure are related to a vehicle comprising: one or more external cameras; a memory; a controller operatively coupled to the one or more external cameras; and a processor operatively coupled to the controller and the one or more external cameras, the processor configured to perform a method comprising: capturing one or more first images of the vehicle's surroundings with the one or more external cameras; storing the one or more first images in the memory; receiving an input corresponding to a request to move the vehicle; in response to receiving the input: capturing one or more second images of the vehicle's surroundings with the one or more external cameras; comparing the one or more second images to the one or more first images to determine whether there are differences between the one or more second images and the one or more first images; in accordance with a determination that there are not differences between the one or more second images and the one or more first images, autonomously moving the vehicle in accordance with the input; and in accordance with a determination that there are differences between the one or more second images and the one or more first images, determining whether the differences are indicative of an object proximate to the vehicle.

Some examples of the disclosure are related to a non-transitory computer-readable storage medium having stored thereon a set of instructions for controlling a vehicle including a processor, wherein the instructions, when executed by the processor, cause the processor to perform a method comprising: capturing one or more first images of the vehicle's surroundings with one or more external cameras of the vehicle; storing the one or more first images in a memory included in the vehicle; receiving an input corresponding to a request to move the vehicle; in response to receiving the input: capturing one or more second images of the vehicle's surroundings with the one or more external cameras; comparing the one or more second images to the one or more first images and determining whether there are differences between the one or more second images and the one or more first images; and in accordance with a determination that there are not differences between the one or more second images and the one or more first images, autonomously moving the vehicle in accordance with the input, and in accordance with a determination that there are differences between the one or more second images and the one or more first images, determining whether the differences are indicative of an object proximate to the vehicle.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method of controlling a vehicle, the method comprising:
   capturing one or more first images of the vehicle's surroundings with one or more external cameras of the vehicle;
   storing the one or more first images in a memory included in the vehicle;
   receiving an input corresponding to a request to move the vehicle;
   in response to receiving the input: capturing one or more second images of the vehicle's surroundings with the one or more external cameras;
   comparing the one or more second images to the one or more first images and determining whether there are differences between the one or more second images and the one or more first images; and
   in accordance with a determination that there are not differences between the one or more second images and the one or more first images, autonomously moving the vehicle in accordance with the input, and in accordance with a determination that there are differences between the one or more second images and the one or more first images, determining whether the differences are indicative of an object proximate to the vehicle;
   wherein: capturing the one or more first images occurs while performing a parking operation for the vehicle; storing the one or more first images occurs upon completion of the parking operation; and receiving the input corresponding to the request to move the vehicle occurs after the completion of the parking operation.

2. The method of claim 1, further comprising: in accordance with a determination that the differences between the one or more second images and the one or more first images are indicative of an object proximate to the vehicle, transmitting the one or more second images to a mobile device associated with a user of the vehicle; after transmitting the one or more second images to the mobile device, receiving a first input from the mobile device; and in response to receiving the first input from the mobile device: in accordance with a determination that the first input corresponds to a request to move the vehicle, autonomously moving the vehicle; and in accordance with a determination that the first input corresponds to a request to not move the vehicle, preventing the vehicle from moving.

3. The method of claim 1, further comprising: in accordance with a determination that the differences between the one or more second images and the one or more first images are indicative of an object proximate to the vehicle, generating one or more of a visual or auditory alert; after generating the one or more of the visual or auditory alert, determining whether the object is still proximate to the vehicle; in accordance with a determination that the object is no longer proximate to the vehicle, autonomously moving the vehicle; and in accordance with a determination that the object is still proximate to the vehicle: preventing the vehicle from moving; and transmitting a notification of the proximate object to a mobile device associated with a user of the vehicle.

4. The method of claim 1, further comprising: in accordance with a determination that the differences are indicative of an object proximate to the vehicle: selecting a path of vehicle motion in a direction such that the vehicle will avoid the object; and autonomously moving the vehicle along the selected path.

5. The method of claim 1, wherein determining whether the differences between the one or more second images and the one or more first images are indicative of an object proximate to the vehicle includes sampling data from one or more of a LIDAR sensor and an ultrasonic sensor.

6. The method of claim 1, wherein determining whether the differences between the one or more second images and the one or more first images are indicative of an object proximate to the vehicle includes sampling data from one or more of a GPS sensor, a clock, and weather data.

7. The method of claim 1, further comprising: in accordance with a determination that the differences are not indicative of an object proximate to the vehicle, autonomously moving the vehicle; and in accordance with a determination that the differences are indicative of an object proximate to the vehicle, preventing the vehicle from moving.

8. The method of claim 1, wherein the input corresponding to the request to move the vehicle comprises an input received from a mobile device associated with a user of the vehicle to move the vehicle to a location of the user.

9. The method of claim 1, wherein determining whether the differences are indicative of an object proximate to the vehicle includes determining a probability that the differences are indicative of an object proximate to the vehicle; and in accordance with a determination that the probability is above a first probability threshold, preventing the vehicle from moving; and in accordance with a determination the probability is below a second probability threshold, autonomously moving the vehicle.

10. The method of claim 1, further comprising: after storing the one or more first images and before capturing the one or more second images: turning off a power supply of the vehicle; and after turning off the power supply of the vehicle, turning on the power supply of the vehicle.

11. The method of claim 1, wherein determining whether there are differences between the one or more second images and the one or more first images comprises disregarding differences outside of a predetermined region of the images corresponding to an area within a threshold distance of the vehicle.

12. The method of claim 1, wherein determining whether the differences between the one or more second images and the one or more first images are indicative of an object proximate to the vehicle comprises: processing the one or more second images to identify one or more objects in the one or more second images; in accordance with a determination that at least one of the one or more objects in the one or more second images is proximate to the vehicle, determining that the differences between the one or more second images and the one or more first images are indicative of an object proximate to the vehicle; and in accordance with a determination that the one or more objects in the one or more second images are not proximate to the vehicle: determining that the differences between the one or more second images and the one or more first images are not indicative of an object proximate to the vehicle; and autonomously moving the vehicle in accordance with the input.

13. The method of claim 12, wherein autonomously moving the vehicle comprises selecting a path for the vehicle based at least in part on object identification performed using the one or more first images before the input corresponding to the request to move the vehicle was received.

14. A vehicle comprising:
one or more external cameras;
a memory;
a controller operatively coupled to the one or more external cameras; and
a processor operatively coupled to the controller and the one or more external cameras, the processor configured to perform a method comprising:
    capturing one or more first images of the vehicle's surroundings with the one or more external cameras;
    storing the one or more first images in the memory;
    receiving an input corresponding to a request to move the vehicle;
    in response to receiving the input: capturing one or more second images of the vehicle's surroundings with the one or more external cameras; comparing the one or more second images to the one or more first images to determine whether there are differences between the one or more second images and the one or more first images;
    in accordance with a determination that there are not differences between the one or more second images and the one or more first images, autonomously moving the vehicle in accordance with the input; and
    in accordance with a determination that there are differences between the one or more second images and the one or more first images, determining whether the differences are indicative of an object proximate to the vehicle;
wherein: capturing the one or more first images occurs while performing a parking operation for the vehicle; storing the one or more first images occurs upon completion of the parking operation; and receiving the input corresponding to the request to move the vehicle occurs after the completion of the parking operation.

15. A non-transitory computer-readable storage medium having stored thereon a set of instructions for controlling a vehicle including a processor, wherein the instructions, when executed by the processor, cause the processor to perform a method comprising:
    capturing one or more first images of the vehicle's surroundings with one or more external cameras of the vehicle;
    storing the one or more first images in a memory included in the vehicle;
    receiving an input corresponding to a request to move the vehicle;
    in response to receiving the input: capturing one or more second images of the vehicle's surroundings with the one or more external cameras;
    comparing the one or more second images to the one or more first images and determining whether there are differences between the one or more second images and the one or more first images; and
    in accordance with a determination that there are not differences between the one or more second images and the one or more first images, autonomously moving the vehicle in accordance with the input, and in accordance with a determination that there are differences between the one or more second images and the one or more first images, determining whether the differences are indicative of an object proximate to the vehicle;
wherein: capturing the one or more first images occurs while performing a parking operation for the vehicle; storing the one or more first images occurs upon completion of the parking operation; and receiving the input corresponding to the request to move the vehicle occurs after the completion of the parking operation.

* * * * *